July 16, 1940.     H. J. MURPHY         2,208,547
UNIVERSAL JOINT
Filed Sept. 4, 1937      2 Sheets-Sheet 1
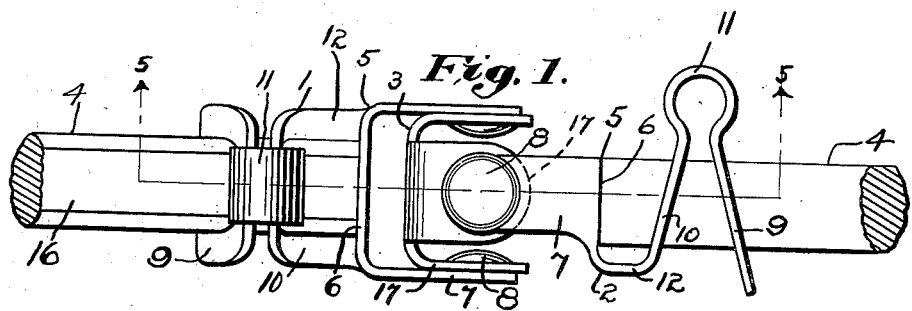
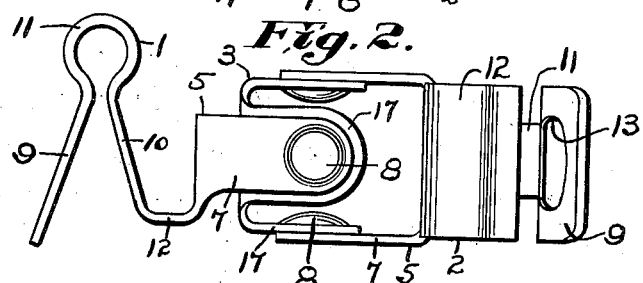
 
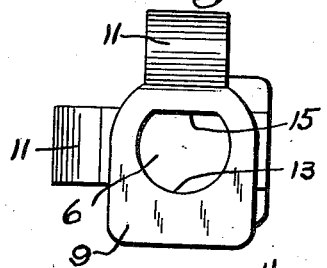 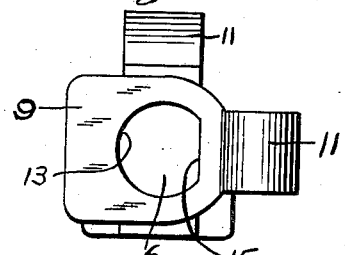
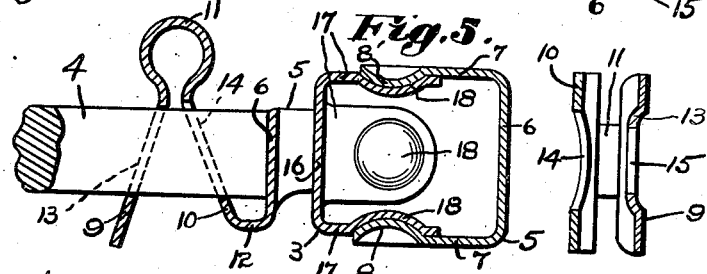
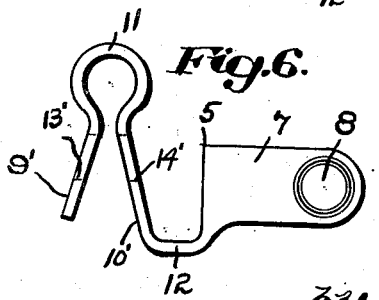 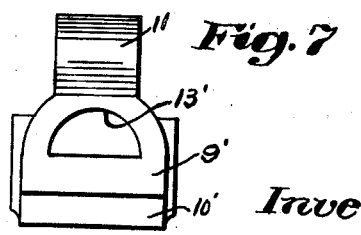
Inventor:
Howard J. Murphy.
Walter S. Jones
Att'y.

July 16, 1940.  H. J. MURPHY  2,208,547
UNIVERSAL JOINT
Filed Sept. 4, 1937   2 Sheets-Sheet 2
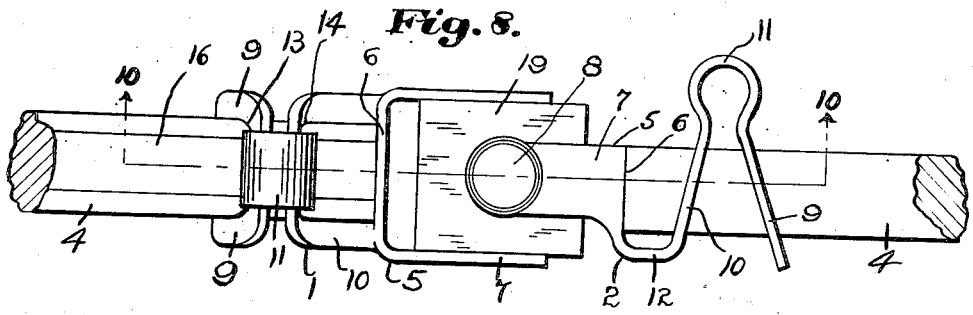
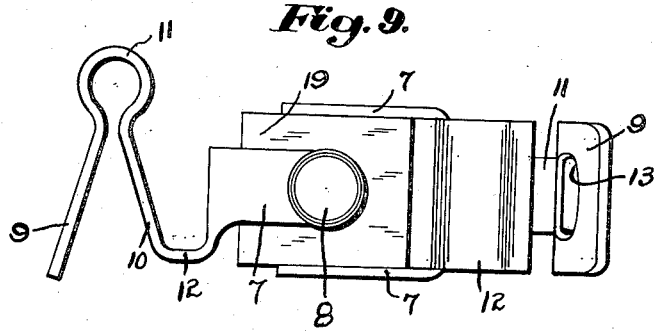
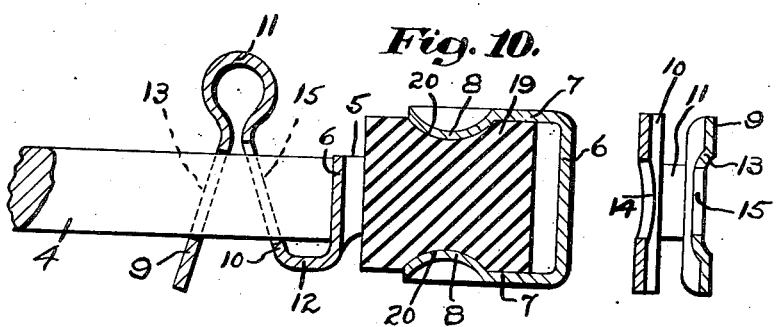
Inventor:
Howard J. Murphy,
by Walter S. Jones
Att'y Patented July 16, 1940

2,208,547

UNITED STATES PATENT OFFICE 2,208,547

UNIVERSAL JOINT

Howard J. Murphy, Greenwood, Mass., assignor to United-Carr Fastener Corporation, Cambridge, Mass., a corporation of Massachusetts Application September 4, 1937, Serial No. 162,545

5 Claims. (Cl. 64—17)

My invention relates to improvements in universal joints and has for its main object to provide a universal joint of novel construction enabling the respective parts thereof to be detachably assembled together in an easy manner.

My invention is particularly adaptable for use with radio, automobile and the like apparatus in which it is desired to connect two control members having angular positions so that rotary movement applied to one of the members may be imparted to the other of the members.

Referring to the drawings in which I have illustrated preferred embodiments of my invention:

Figure 1 is a front view of my improved device with a pair of shaft members assembled therewith;

Fig. 2 is a view of my device turned 45° from the position shown in Fig. 1, the shaft members being omitted;

Fig. 3 is an end view of my device looking from the left of Fig. 2;

Fig. 4 is an end view of my device looking from the right of Fig. 2;

Fig. 5 is a section taken along the line 5—5 of Fig. 1;

Fig. 6 is a view of a modified form of an end member of my device;

Fig. 7 is a view of my modified end member looking from the left of Fig. 6;

Fig. 8 is a front view of a second form of my device with a pair of shaft members assembled therewith;

Fig. 9 is a view of my second form of device turned 45° from the position shown in Fig. 8, the shaft members being omitted; and Fig. 10 is a section taken along the line 10—10 of Fig. 8.

Referring to the preferred form of my device, as illustrated in Figs. 1 through 5 of the drawings, I have shown a universal joint of simple construction comprising end members 1 and 2 which are preferably formed of sheet metal material and provided with jaw portions for detachably receiving between them an intermediate member 3 in such a way as to permit free movement of the parts when the end members are in angular relation one with another whereby the device may effectively carry out the purposes for which it is intended. Each of the end members 1 and 2 has fastener means at one end adapted to detachably engage a shaft member 4 for operatively connecting the shaft members with the end members.

Referring in detail to the construction of the end members 1 and 2, each of the end members has an attaching portion 5 at one end for pivotally connecting the respective end members 1 and 2 with the intermediate member 3. The attaching portion 5 in my preferred form is of substantially U-shaped construction having a base portion 6 and a pair of spaced substantially parallel leg portions 7—7 extending in substantially perpendicular relation to the base portion. The leg portions 7—7 of each of the attaching portions in my preferred form are provided with snap fastener means in the form of inwardly extending bumps 8 near their free ends adapted for detachable pivotal co-engagement with cooperating depressions of the intermediate member 3, as will be hereinafter more fully described. As a means for detachably securing shaft members to the end members, I have provided a novel spring fastener means at an end of each of the attaching portions adapted for frictional engagement with a respective shaft member for securing the shaft member to the end member. The spring fastener means of each of the end members in my preferred form has an outer spring arm 9 and an inner spring arm 10 joined together at their ends by a connecting portion 11. Each of the pairs of arms 9 and 10 is connected to the attaching portion 5 of the respective end member by a portion 12 integral with an opposite end of the inner arm 10 from that connected to the outer arm 9. The outer arm 9 has an aperture 13 and the inner arm 10 an aperture 14 for receiving an end of one of the shafts 4 during coupling of the same to the end member. Each of the apertures 13, in my preferred form, has a flat side 15, as most clearly shown in Figs. 3 and 4, for cooperating with a flat side 16 of the shafts 4—4 (Fig. 5) for preventing relative rotation of the parts. In the form of my invention illustrated in the drawings, the apertures 14 of the inner arms 10 have a round shape, but I do not wish to be limited by this particular shape of the apertures 14 as my spring fastening means would be capable of efficiently coupling a pair of shafts to the end members if the aperture 14 of the arm 10 of each pair of arms had a flat side similar to that provided by the aperture 13 of the corresponding arm 9. When the arms 9 and 10 of each pair are inactive they are in inclined relation to each other with the apertures 13 and 14 of each pair slightly out of alignment.

The intermediate member 3, in my preferred form, is made of one piece of sheet metal and comprises a substantially square base portion 16 having a wing portion 17 extending from each of the side edges of the base portion in substantially perpendicular relation to the base portion so that the wing portions extending from opposed sides of the base portion are disposed in opposite spaced relation one to another. Each of the wing portions 17 in my preferred form has an indentation 18 near its outermost end for receiving a bump 8 of a leg 7 of a respective attaching portion 5 so as to detachably connect the end members 1 and 2. It will be noticed that the particular engagement of the parts by which the bumps 8 of the legs 7 co-engage with the depressions 18 of the wings 17 allows relative pivotal movement of the intermediate portion 3 and the attaching portions 5 for permitting the end members 1 and 2 to move in angular directions.

Assembly of the component parts of my universal joint device is a relatively simple matter and may be carried out without the use of tools through simply snapping the bumps 8 of the pairs of legs 7—7 into co-engaging relation with the depressions 18 of corresponding pairs of wing portions 17—17. The end members 1 and 2 are now securely fastened to the intermediate member 3 and are freely movable relative to the intermediate member 3 so that they may assume angular positions. Attachment of the shafts 4—4 through means of the spring fastener means provided by each of the end members 1 and 2 is carried out in a relatively easy manner by extending an end of one of the shafts 4—4 through the apertures 13 and 14 of each of the respective pairs of spring arms. During passage of an end of a shaft through the spring arms of each of the pairs the pressure of the shaft causes the spring arms to contract whereby the apertures 13 and 14 of each of the pairs are brought into alignment so as to permit passage of the shaft through the arms until the outermost end thereof abuts the base portions 6 of the respective attaching portion 5 (Figs. 1 and 5). After the shaft has been moved through the arms into abutting engagement with the attaching portion the resilient tendency of the pair of arms causes the arms 9 and 10 of each pair to expand whereby the material of the arms adjacent the respective apertures 13 and 14 engages the shaft member in a spring grip. The shaft members 4—4 are now securely coupled to the universal joint and, as a result of the cooperating means provided by the pairs of arms and the respective shaft members for preventing relative rotation, a rotary action applied to one of the shaft members is transmitted through the transmission member 3 to the other shaft member. To detach the shaft members from the respective end members it is necessary simply to move the outer arm 9 of each pair toward the respective inner arm 10 until their apertures are in substantial alignment whereupon the shaft members may be readily removed from the arms. It is important to notice in connection with my preferred form of device that, although I have provided a pair of spring arms as a part of each of the end members for securing a shaft thereto, a shaft member might be readily connected to an end member by a single spring arm only providing a bearing-like means, such as an apertured arm (not shown) in perpendicular relation to the axis of the shaft, were provided for maintaining the shaft member in proper position to be gripped by the spring arm.

My modified form of end member shown in Figs. 6 and 7 is similar in form to my preferred end members 1 and 2 shown in Figs. 1–5, but provided with a shorter outer spring arm 9' than the arm 9 of my preferred form so as to allow room for a tool to engage the inner arm 10' for bending the same in one method of manufacturing the devices.

My second form of universal joint device illustrated in Figs. 8–10 of the drawings is almost identical to my first form of device, as shown in Figs. 1–5, but differs from my first form in that instead of employing a metal intermediate member of the shape shown in my first form for the purpose of connecting the end members, I have employed a cube-like block 19 of insulating material. The block 19 has a depression 20 (Fig. 10) in each of four sides of the same for pivotal co-engagement with respective bumps 8 of the end members whereby the end members are detachably connected together and capable of moving in angular relation as described in connection with the parts of my first form of invention. My insulated form of universal joint is particularly useful in radio and other electrical manufacture wherein it is desirable to connect members such as a pair of switch control shafts which are disposed in angular relation.

Thus by my invention I have provided universal joint devices comprising parts of simple construction which may be easily and quickly assembled together and capable of effectively carrying out the desired purpose.

Although I have illustrated and described preferred embodiments of my invention, I do not wish to be limited thereby as the scope of my invention is best set forth in the following claims.

I claim:

1. An article of the class described comprising a pair of end members and an intermediate member disposed therebetween, each of said end members having an attaching portion, and said intermediate member and said attaching portions having co-engaging snap fastener means to detachably connect said end members for movement in angular directions.

2. An article of the class described comprising a pair of end members and an intermediate member disposed therebetween, each of said end members having an attaching portion including a base portion and spaced leg portions extending therefrom, and said intermediate member and said leg portions having co-engaging snap fastener means to detachably connect said end members for movement in angular directions.

3. An article of the class described comprising a pair of end members and an intermediate member disposed therebetween, each of said end members having an attaching portion including a base portion and oppositely disposed spaced leg portions extending therefrom, said leg portions having bump portions and said intermediate member having depressions receiving said bump portions to detachably connect said end members for movement in angular directions.

4. An article of the class described comprising a pair of end members and an intermediate member disposed therebetween, said intermediate member having a base portion and pairs of oppositely disposed wing portions extending from said base, each of said end members having an attaching portion including a base portion and oppositely disposed spaced leg portions extending therefrom, said leg portions and said wing portions having co-engaging fastener means to connect said end members for movement in angular directions.

5. An article of the class described comprising a pair of end members and an intermediate member disposed therebetween, each of said end members having an attaching portion, said intermediate member and said attaching portions having co-engaging snap fastener means to detachably connect said end members for movement in angular directions, and each of said end members having an apertured spring arm at an end of said respective attaching portion, the arm of each of said respective members being adapted to receive a shaft member through its aperture and frictionally engage said shaft whereby said shafts are secured to said members.

HOWARD J. MURPHY.